Patented Dec. 31, 1935

2,025,870

UNITED STATES PATENT OFFICE 2,025,870

PROCESS FOR PRODUCING SICCATIVES

Wilhelm Krumbhaar, Detroit, Mich., assignor to Beck, Koller & Company, Inc., Detroit, Mich., a corporation of Delaware No Drawing. Application October 24, 1934, Serial No. 749,364

8 Claims. (Cl. 134—57)

The invention relates to the preparation of organic metal compounds that are intended for use as driers in the paint and varnish industry, and especially to resinates, naphthenates, oleates, and the like.

A large number of methods are known in the art of making compounds of this general type, intended for use as driers. One method, comprising precipitating oil soluble soaps of the drier metals out of the water solution of the respective salts, is complicated and expensive. Another method, comprising incorporating lead and manganese into oil by boiling the watery suspension of the precipitated hydroxides of said metals with the oil, is slow because the hydroxides are agglomerating. Still another process, known as the fusion method, which is carried out by fusing directly the basic metal compounds with the organic acids or their glycerides at higher temperatures of between 400-500° F., is disadvantageous in yielding dark and highly acid products. The solution method of making driers by reacting the solution of organic acids in suitable solvents with metal compounds has serious disadvantages because it involves a considerable fire risk, and the solutions are not stable.

My invention overcomes all previous disadvantages, is simple, quick and cheap, and involves no fire risk. The products resulting therefrom are definite in composition, uniform, efficient, stable and light in color.

The new process involves the step of precipitating the hydroxides of the heavy metals that are commonly used as driers, as for instance, calcium, zinc, manganese, cobalt, lead, etc., out of the aqueous solutions of their respective metal salts, as for instance their sulphates, chlorides, acetates, etc., in the usual way, but at room temperature or preferably even lower, and using water freed from oxygen or air by previous boiling.

It is important that the hydroxides be precipitated at low temperatures in order to obtain them in the finest state of colloidal subdivision. Even slightly higher temperatures cause agglomeration and crystallization which in turn decreases the reactivity. It is also important that air be excluded during precipitation and the subsequent procedures, because some of the hydroxides become less reactive by oxidation.

The wet precipitate is then washed by air-free cold water, which has been previously boiled. This washing can be done in the usual way either in a filter press or in the vat, until neutral reaction is reached.

The water wet paste of the hydroxides is now mixed with an oily dispersing medium (for instance, linseed or wood oil stand oil of high dispersion power) in a kneading machine or a mixer of special design, preferably of the closed roller mill type, excluding air and allowing the use of vacuum. By kneading at room temperature the excess of water comes out easily and the residue of moisture adsorbed at the surfaces of the particles is removed by putting the paste under vacuum, the whole procedure taking two to three hours. Instead of non-volatile dispersing agents such as oils, high boiling esters and the like, volatile solvents common in the paint and varnish industry, or combinations of both, may be used. It is also possible to use organic acids or solutions thereof in making the paste, the use of which acids or solutions thereof, however, is limited by thickening and hardening of the mass.

After the kneading procedure, the paste of hydroxide is reacted with the desired organic acids, for instance, naphthenic, abietic, drying or non-drying fatty acids, etc., or their respective glycerides by fusing or solution methods in the usual way. This reaction, however, starts at temperatures much lower than hitherto known, the reaction proceeds more quickly and completely and leads to lighter and purer products than have been known up to now. This is due to the fact that the paste made in the way described above contains the hydroxides of the drier metals in a fineness of dispersion and a degree of reactivity which has not heretofore been obtainable. The reaction temperatures are mostly 50-100° F. lower than those necessary for the usual hydroxides, in many cases the difference in reactivity being even larger. This is especially noticeable with cobalt hydroxide. The ordinary cobalt hydroxide does not react at all with a solution of abietic acid in mineral spirits, even if heated up to the boiling point of the solution. The hydroxides made according to the process described, however, react with this solution completely at temperatures not exceeding 200° F.

The invention will be more fully understood by reference to the following examples:

*Example 1*

Cobalt sulphate solution is precipitated by the use of an alkali solution at room temperature, and the precipitated cobalt hydroxide brought on a filter press and washed. The resulting wet paste is immediately mixed with half the amount of linseed oil stand oil and kneaded in the mixer. As soon as the main part of water has separated out, vacuum is applied in a closed vessel to remove the residue of water. The paste thus obtained is then dissolved in a 50% solution of rosin and mineral spirits, the amount of which may be varied according to the degree of color and neutrality wanted, and according to the metal content required. The solution is heated to about 200° F., whereby the reaction between abietic acid and cobalt hydroxide commences under these conditions, and approximately this temperature is maintained until the reaction is completed. The resulting product has a light color which cannot be obtained by any other process hitherto known.

*Example 2*

Manganese hydroxide is precipitated in the usual way from a solution of manganese chloride, treated in the same way as described in Example 1, dehydrated with a small amount of linseed oil fatty acids and slight heating in an atmosphere of $CO_2$. The reaction between the manganese hydroxide and the linseed oil stand oil starts and proceeds at 300–350° F., giving a product of unusually light color.

*Example 3*

Lead hydroxide is precipitated from a solution of lead acetate. The precipitate, in a wet state, is dehydrated by milling at ordinary temperature with thin linseed oil stand oil, followed up by appliance of vacuum within a closed vessel. The paste thus obtained is then heated with additional stand oil up to 100–150° F., where the reaction between oil and lead hydroxide is going on even without further addition of any organic acid.

*Example 4*

Calcium hydroxide obtained in the usual way but precipitated at low temperature is dehydrated in the kneading machine by means of polymerized China wood oil. The oily paste is heated up with an amount of colophony such that 5% by weight of calcium hydroxide figured on the basis of the rosin is present. The reaction starts and goes on at the surprisingly low temperature of 300–350° F., giving a resinate of unusually light color.

It will be understood that the above examples are intended as illustrative only of the inventive thought embodied in this disclosure, and are not intended to limit the invention to the specific details set forth therein.

What I claim is:

1. A process for producing a finely divided, light colored metallic drier for use in the paint and varnish industry, which comprises precipitating a hydroxide of a metal commonly used as a drier at a temperature not above room temperature under non-oxidizing conditions, dispersing the precipitate in an oil, and reacting the dispersed precipitate without drying the same with a member of a group consisting of resinic, naphthenic and soap forming fatty acids and their glycerides at a temperature below 400° F.

2. A process as set forth in claim 1, wherein the dispersion of the precipitate is increased by the use of vacuum.

3. A process as set forth in claim 1, wherein the reaction takes place at a temperature not exceeding the range of 300°–350° F.

4. A process as set forth in claim 1, wherein the metal employed is selected from the group consisting of cobalt, manganese, lead, calcium and zinc.

5. A process as set forth in claim 1, wherein the hydroxide is dispersed in a drying oil.

6. A process as set forth in claim 1, wherein the dispersed precipitate is reacted with abietic acid.

7. A process as set forth in claim 1, wherein the dispersed hydroxide is reacted with stand oil.

8. A process as set forth in claim 1, wherein the precipitated hydroxide in paste form is mechanically dispersed in the oil by a kneading operation.

WILHELM KRUMBHAAR.